United States Patent [19]
Harbert

[11] 4,019,456
[45] Apr. 26, 1977

[54] MARINE WET EXHAUST SYSTEM AND IMPROVEMENTS IN POWERED MARINE VESSEL

[75] Inventor: Earl W. Harbert, Fort Lauderdale, Fla.

[73] Assignee: Whittaker Corporation, Los Angeles, Calif.

[22] Filed: May 5, 1976

[21] Appl. No.: 683,452

[52] U.S. Cl. ................................ 115/73; 60/310; 55/276; 181/51
[51] Int. Cl.² .................... B63H 21/34; F01N 3/04
[58] Field of Search ............. 115/.5 E, 34; 60/310, 60/311; 181/43, 51, 52; 55/276, DIG. 30

[56] References Cited
UNITED STATES PATENTS

| | | | |
|---|---|---|---|
| 1,892,853 | 1/1933 | Rustin et al. | 55/276 |
| 3,176,791 | 4/1965 | Betts et al. | 181/57 |
| 3,296,997 | 1/1967 | Hoiby et al. | 60/310 |
| 3,553,944 | 1/1971 | Hum et al. | 55/276 |

*Primary Examiner*—Trygve M. Blix
*Assistant Examiner*—Jesus D. Sotelo
*Attorney, Agent, or Firm*—Donald E. Nist

[57] ABSTRACT

An exhaust gas-cooling water separation chamber, a gas collection chamber and gas acceleration and gas flow-shaping conduit means. The entrance of the separation chamber is connectable to water coolant and gas exhaust tubes from a marine engine. The separation chamber is fitted with a water deflector disposed below the gas exit from that chamber, while a gas dam is disposed in the water exit from that chamber, the entrance and water exit going below the deflector level. The gas collection chamber is connected to the gas exit and a gas acceleration chamber which tapers downstream is connected to the gas collection chamber. A gas velocity tube is connected to and extends downstream of the gas acceleration chamber to cause exhaust gases to exit through the hull of a boat in which the system may be installed with sufficient force to penetrate the turbulent boundary layer of air around the boat hull when the boat is in motion, thus preventing the gases from passing back into the rear of the boat, due to the "station wagon" effect. An air dilution tube can be connected to the gas velocity tube to provide a scarfing action by the exhaust gases, causing their dilution to below noxious levels. The system may include exhaust noise-retarding means, such as a muffler and/or air barrier at the separation chamber entrance.

27 Claims, 12 Drawing Figures

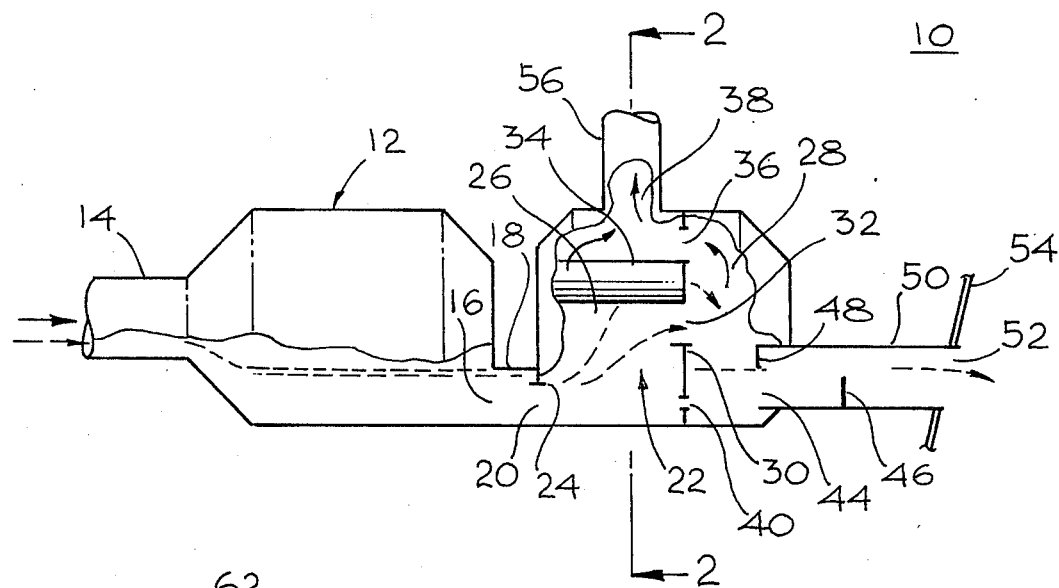
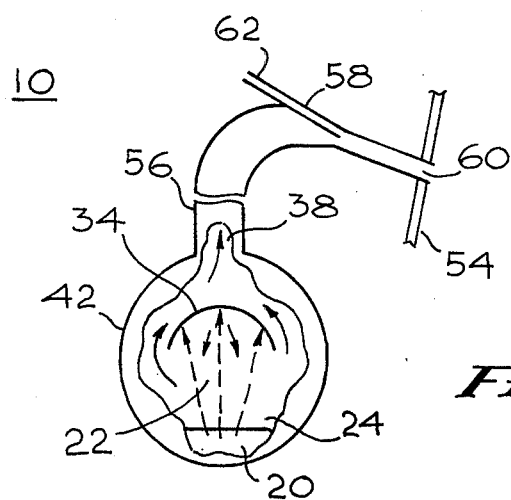
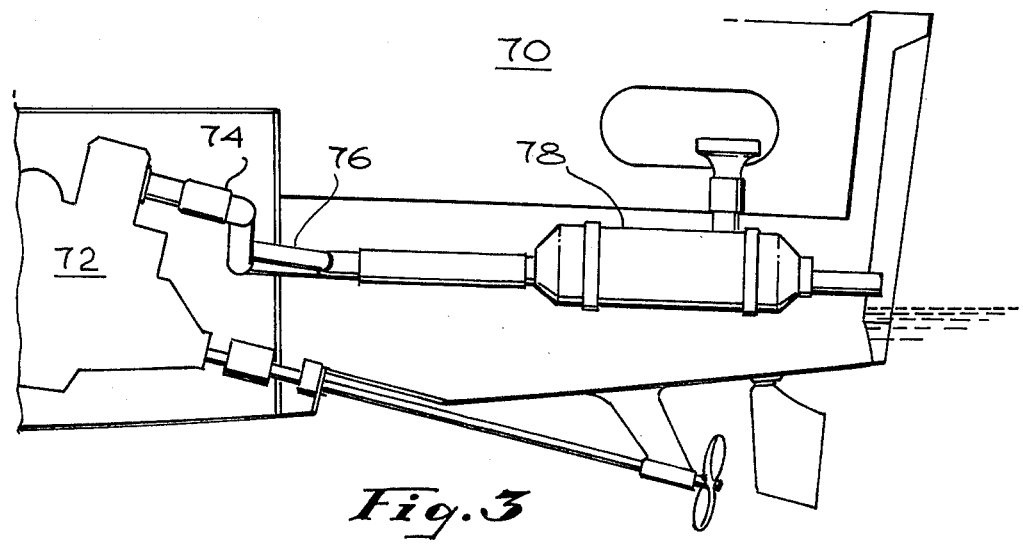

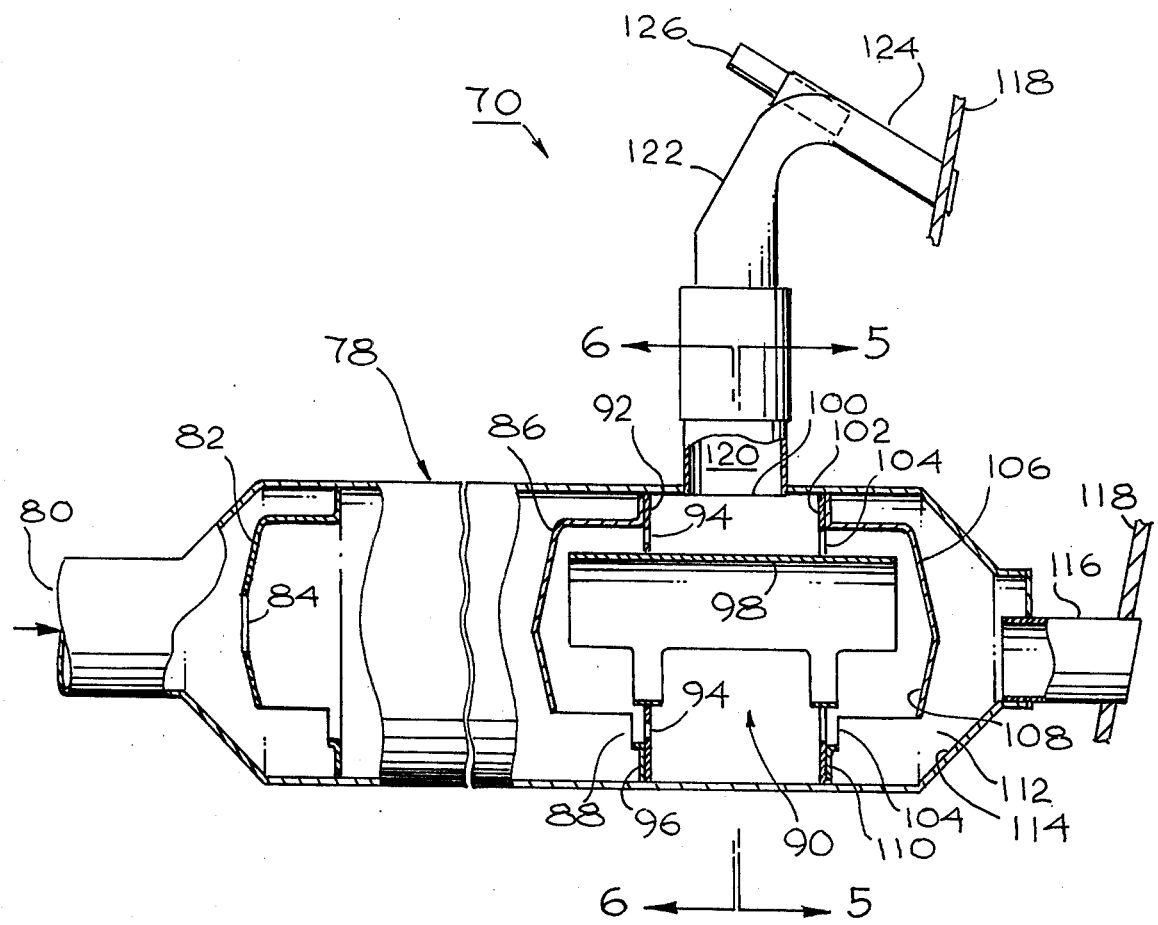
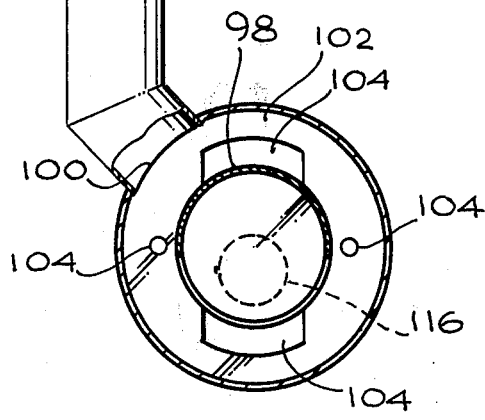
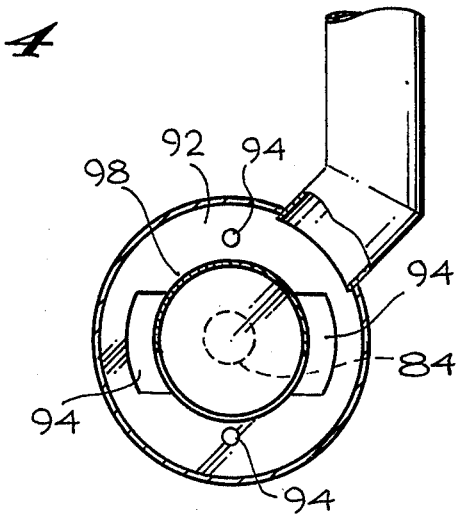
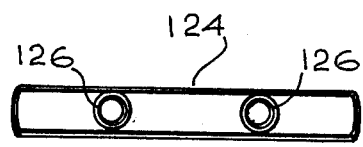

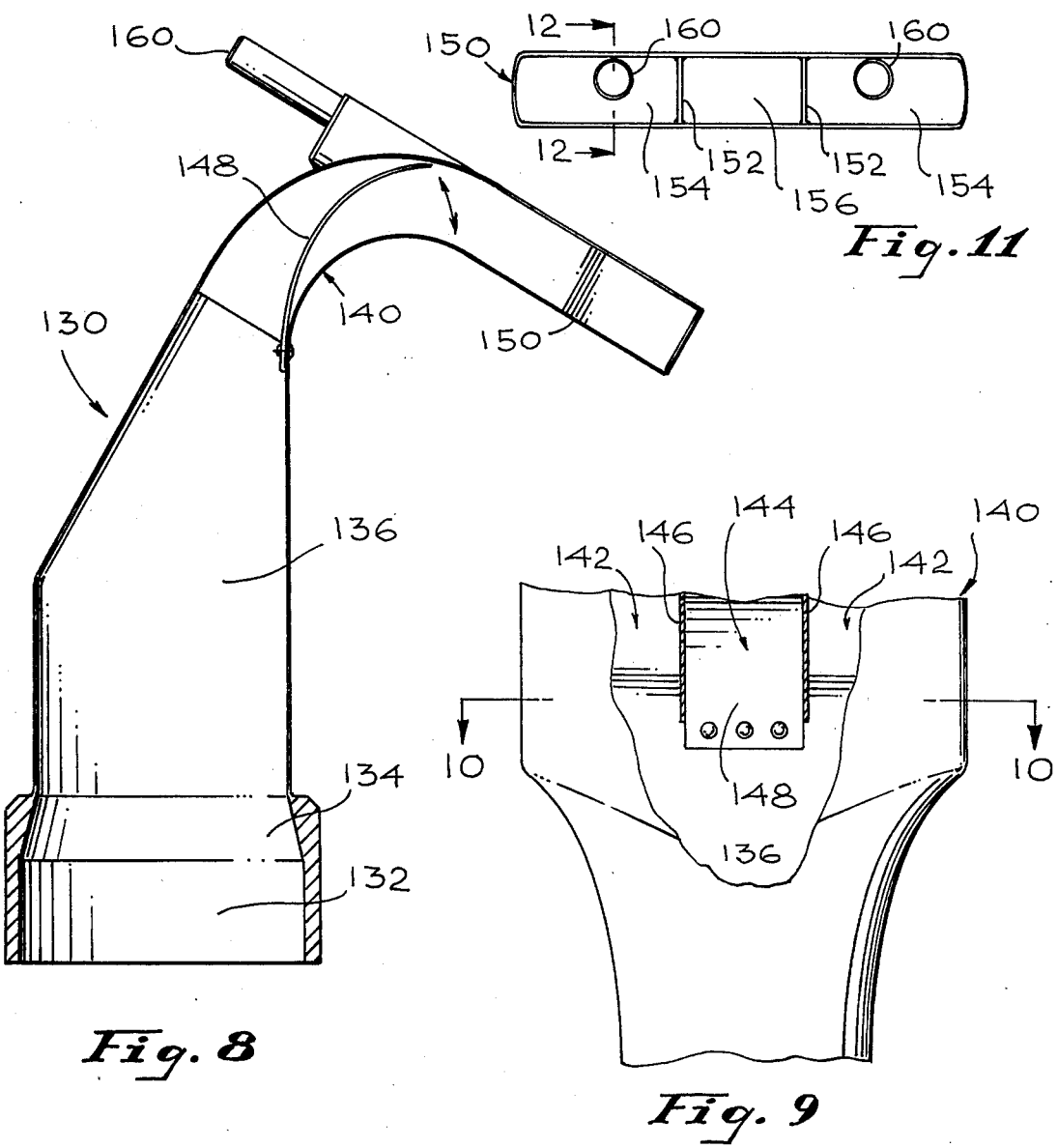
Fig. 8
Fig. 9
Fig. 11
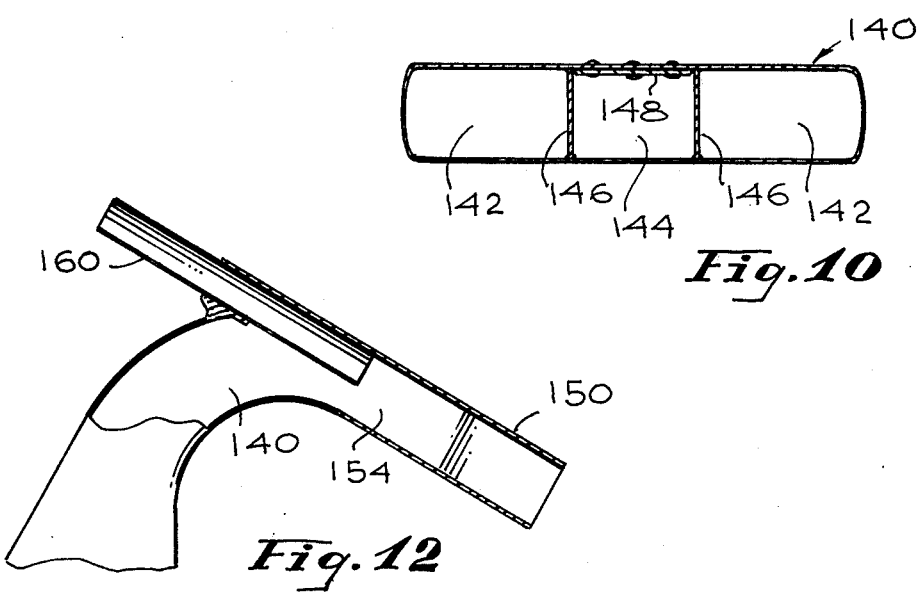
Fig. 10
Fig. 12

MARINE WET EXHAUST SYSTEM AND IMPROVEMENTS IN POWERED MARINE VESSEL

BACKGROUND OF THE INVENTION

1. Field of the Invention

The present invention generally relates to exhaust systems and more particularly to marine wet exhaust systems which prevent the flow of engine exhaust gases back into marine vessels.

2. Prior Art

Most marine exhaust systems are subject to a serious problem, namely, that of permitting the gases exhausted therefrom to flow back into the rear of the vessel. This is particularly the case with power cruisers and motor sailboats in which the rear of the vessel is not fully enclosed. Thus, as such a vessel moves forward through the water, a turbulent boundary layer of air flows along the sides of the vessel. Moreover, the area just to the rear of the vessel becomes a low pressure area. Exhaust gases ejected along the sides or at the rear of the vessel are drawn into this area due to its low pressure and easily pass from this area into the open rear of the boat, endangering and inconveniencing the boat's occupants. This effect is known as the "station wagon" effect, since it also occurs in auto station wagons and normally precludes their rear windows from being open while they are being driven forward. Exhaust gases ejected to the rear of the boat also easily pass into the boat when the boat backs up in the water so that the phenomenon is present, regardless of the direction of the boat.

Previous attempts to prevent the station wagon effect in marine vessels have largely consisted either of exhausting engine gases from the sides or rear of the boat through piping of extended length, or of exhausting the engine gases to the rear of the boat and well below the surface of the water. Neither solution has been suitable. Thus long pipe extensions are difficult to support and are subject to damage by dock structures, other boats, or severe wave action. Moreover, they preclude very close-in maneuvering of the vessel on the side or rear from which the piping extends, which is at least an inconvenience. Underwater exhaust systems tend to create excessive exhaust gas back pressures and thus may seriously interfere with engine efficiency. Moreover, they usually are somewhat ineffective, to prevent the station wagon effect.

Accordingly, there is a need for a simple, durable, inexpensive but highly effective marine exhaust system which will prevent the station wagon effect without interfering either with engine performance or with vessel maneuverability and without providing other drawbacks.

SUMMARY OF THE INVENTION

The present invention satisfies the foregoing needs. The improved marine wet exhaust system of the present invention is substantially as set forth in the Abstract above. It separates cooling water from exhaust gases, accelerates the exhaust gases and shapes the exhaust gas flow so that when the exhaust gases are ejected from the system through the hull of the boat they easily penetrate the turbulent boundary layer of air flowing around the periphery of the moving boat in which the system is installed. Thus, the exhaust gases are propelled sufficiently far away from the sides of the boat, that is, sufficiently far into the turbulent boundary layer of air to preclude the exhaust gases from passing into the rear of the boat by the previously described station wagon effect. Although a low pressure area exists just rear of the boat as the boat moves forward in the water and although this low pressure area normally tends to draw exhaust gases into it from which the gases readily pass into the rear of the boat, the gases exhausted from the present exhaust system are propelled sufficiently far away from the boat so that they are not drawn into the low pressure area and thus do not pass into the rear of the boat system.

Thus, the present system accomplishes the desired effects without resorting to long pipes projecting from the sides or rear of the boat and which could be easily damaged and prevent close docking of the boat. Nor does the present system require ejection of exhaust gases well below the water line, which would tend to create excessive back pressures and inefficient engine operation. Moreover, the improved exhaust system of the present invention is relatively simple, comprising the elements substantially as set forth in the Abstract above. Thus, it includes the gas-water separation chamber, water deflector in the chamber, a gas dam in the water exit from the chamber, a gas collection chamber connected to the gas exit from the chamber and gas acceleration and gas velocity tubes. The system may also include an air dilution tube adjacent the downstream end of the system to dilute the exhaust gases for further protection of the boat passengers, and sound suppression means such as an acoustical chamber and/or air barrier extending down into the water passing into the separation chamber. Other features of the invention are set forth in the following detailed description and accompanying drawings.

DRAWINGS

FIG. 1 is a schematic side elevation of a first preferred embodiment of the improved marine wet exhaust system of the present invention, portions being broken away to illustrate certain internal features;

FIG. 2 is a schematic cross-section taken along the section line 2—2 of FIG. 1;

FIG. 3 is a schematic side elevation of a second preferred embodiment of the improved marine wet exhaust system of the present invention shown attached to a marine engine in place within the hull of a boat;

FIG. 4 is a schematic side elevation of the improved wet exhaust system of FIG. 3 shown with portions broken away to illustrate certain internal features;

FIG. 5 is a schematic cross-section taken along the section line 5—5 of FIG. 4;

FIG. 6 is a schematic cross-section taken along the section line 6—6 of FIG. 4;

FIG. 7 is a schematic front elevation of the velocity tube of FIG. 4, shown with two air dilution tubes disposed therein.

FIG. 8 is a schematic vertical section through the center of a modified version of the exhaust gas collection, gas acceleration and gas flow shaping portions of the improved marine wet exhaust system of the present invention;

FIG. 9 is a fragmentary schematic top plan view, partly broken away, of portions of the components shown in FIG. 8;

FIG. 10 is a schematic cross-section taken along the section line 10—10 of FIG. 9;

FIG. 11 is a schematic downstream end partial view of the components of FIG. 8; and, FIG. 12 is a schematic cross-section taken along the section line 12—12 of FIG. 11.

DETAILED DESCRIPTION

FIGS. 1 and 2

Now referring more particularly to FIG. 1 of the accompanying drawings, a first preferred embodiment of the improved marine wet exhaust system of the present invention is schematically depicted therein in side elevation. Thus, system 10 includes an acoustical chamber 12 which may comprise a conventional marine exhaust muffler or the like having an inlet 14 into which a mixture of engine exhaust gases and cooling water are passed and a single outlet 16 which is positioned at the downstream end of the muffler in the lower portion thereof and is of sufficiently small diameter so that it remains substantially constantly filled with water during use of system 10.

Outlet 16 includes a tubular portion 18 which extends to and forms on its downstream end a portion of the inlet 20 of a gas-water separation chamber 22. Chamber 22 includes at inlet 20 a depending wall 24 which acts as a noise barrier by extending down into water passing through inlet 20 and thus preventing air communication between muffler 12 and chamber 22.

Chamber 22 is divided into a first separation section 26 and second separation section 28 by a vertical baffle 30 having an opening 32 below a generally horizontally disposed water diverter 34 secured inside section 26. Baffle 30 also includes an opening 36 above diverter 34 and adjacent a gas exit 38 disposed in an upper end of section 26, as shown in FIG. 1, above diverter 34. Baffle 30 further includes an opening 40 in the adjacent lower end thereof for passage of water therethrough.

The water and gas mixture entering separation chamber 22 from acoustical chamber 12 encounters baffle 30 and a primary separation of the gases from water occurs at that point in section 26. Water is prevented from entering gas exit 38 by diverter 34 but gases can flow through opening 32 and opening 36 into exit 38. Moreover, as shown in FIG. 2, which is a cross-sectional view of the system 10 along the section lines 2—2 of FIG. 1, it will be noted that diverter 34 is generally arcuate in shape and spaced inwardly from the side walls 42 of chamber 22 so as to permit exhaust gases to flow between side walls 42 and diverter 34 after passing below the lower edge of diverter 34. This arrangement effectively prevents water from passing into gas exit 38.

Section 28 of chamber 22 is designed to permit the free flow of cooling water through a water exit 44 at the downstream end thereof while controlling the water level in chamber 22, as by an upstanding barrier wall 46 in exit 44 which wall 46 acts as a water dam. At the upstream end of exit 44 a gas barrier wall 48 is provided which is designed to depend down into water flowing from chamber 22 through exit 44. Exit 44 is connected to an outlet pipe 50 which is designed to pass water from the boat in which the system 10 is installed through an opening 52 in the boat hull 54.

Gas outlet 38 is connected to a gas collection chamber 56, as shown in detail in FIG. 2. Chamber 56 is connected at its downstream end with a gas acceleration chamber 58 which gradually decreases in diameter from its upstream end to its downstream end. Chamber 58 is designed to provide a minimum loss of velocity through turbulence. Its cross-sectional area is gradually reduced to a size which will create a predetermined gas back pressure in system 10 for any given gas volume flow through chamber 58. The gas velocity obtained is determined by the quantity of gas per amount time passing therethrough and the cross-sectional area at its downstream end.

The downstream end of acceleration chamber 58 is connected to a velocity tube 60 which receives the high velocity exhaust gases from chamber 58 and shapes and directs them in the best way to most easily penetrate with the least amount of deflection the turbulent boundary layer of air adjacent the boat in which the system is installed during motion of the boat, as the pressurized gas is released from the downstream end of velocity tube 60 into the atmosphere. The best configuration is one which presents the smallest profile to the rearwardly moving (relative to the forward moving boat) mass of turbulent boundary air. The exhaust gases exiting tube 60 penetrate the air boundary layer sufficiently so that the gases are propelled beyond the influences of a low pressure area directly adjacent to and downwind from the boat.

System 10 preferably includes an air dilution insertion tube 62 which is preferably installed with its downstream end located in the negative pressure area that occurs at the upstream end of velocity tube 60, that is, at the point of maximum acceleration of the gases. Tube 62 is preferably shaped to cause a scarfing action by the exhaust gases in velocity tube 60 during low gas volume flow periods, as when the engine connected to system 10 is idling. This phenomenon occurs at all times when the engine is running. The upstream end of dilution tube 62 is connected to a flow of fresh air outside the boat [not shown] as by being run to an opening in the boat hull 54 [not shown]. Air is pulled into system 10 by the negative pressure at the upper end of tube 60 and flows through tube 62, effectively diluting exhaust gases in tube 60 so as to further protect boat passengers against noxious fumes and to reduce pollution.

System 10 may be connected through suitable piping means [not shown] with the exhaust pipes [not shown] of a marine engine [not shown] installed within boat hull 54. If desired, two or more of systems 10 could be connected to exhaust pipes running from the marine engine.

Most usually, however, when two systems 10 are present, there are twin engines present, one system 10 per engine. It will be understood that acoustical chamber 12 and acoustical wall 24 are not essential to system 10 nor is air dilution tube 62. However, these components are preferred in order to reduce concentration of toxic fumes and eliminate noise pollution. System 10 functions effectively in various sizes of boats both at idling speeds and at cruising and maximum speeds to effectively eject exhaust gases at high velocity away from the periphery of the boat so that the gases are not passed back into the boat. System 10 can be manufactured from readily available materials such as corrosion resistant materials, resin impregnated fiberglass and other durable inexpensive materials.

FIG. 3–7

Now referring more particularly to FIG. 3 of the accompanying drawings, a second preferred embodiment of the improved marine wet exhaust system of the present invention is shown schematically therein connected to a marine engine in place within the hull of a boat, thereby constituting improvements in a power marine vessel in accordance with the present invention. Thus, an improved wet exhaust system 70 is shown in side elevation interconnected to a marine engine 72 through one or more exhaust pipes 74 and manifold 76. Manifold 76 is secured at its downstream end to a muffler 78.

Now referring more particularly to FIG. 4 of the accompanying drawings the improved system 70 is schematically set forth in side elevation with portions broken away to illustrate internal features of system 70. Thus, muffler 78 is shown which is an elongated acoustical chamber having an inlet 80, a first baffle 82 with central port 84 adjacent inlet 80 and a second baffle 86 which is secured to the top of muffler 78 adjacent the downstream thereof and which terminates above the bottom of muffler 78 to provide an exit port 88. Muffler 78 is secured to the upstream end of coolant water-exhaust gas separation chamber 90 defined, in part, by baffle 86 and by a vertical baffle 92 secured thereto and defining entry ports 94 [see FIG. 6]. The lower end of baffle 92 is secured to a barrier plate 96, as shown in FIG. 4.

Chamber 90 also includes a water diverter 98 which is spaced above the bottom of chamber 90 but below the top thereof and is centered below a gas exit port 100 to prevent water from passing therein. Diverter 98 is a generally cylindrical open ended tube disposed lengthwise in chamber 90 and secured in place by baffle 92 and by a similar vertical baffle 102 adjacent the rear end of chamber 90 and including exit ports 104 (see FIG. 5). Diverter 98 is cut away along the lower sides thereof so that gases can not only pass through the length thereof but can escape below the sides thereof to pass into exit port 100. Diverter 98 is spaced between baffle 86 and a substantially identical baffle 106, both of which are generally derby shaped with the lower portion thereof cut away. Baffle 106 extends downwardly towards the bottom of chamber 90 to form an air dam in the region 108 thereof. Baffle 102 is secured at its bottom end to a barrier plate 110 similar to plate 96 and at its upper end to baffle 106. The lower end of baffle 106 is below the upper end of the lowermost port 104 to provide air dam 108, as described. A water collection chamber 112 is secured around the downstream end of chamber 90 and includes an area which decreases in cross-section and the lower portion of which forms a water dam 114. The downstream end of chamber 112 is secured to a water outlet tube 116 which runs through the hull 118 of the boat to permit water to be exhausted from system 70.

When the mixture of coolant water and exhaust gases passes into system 70 from marine engine 72 through pipes 74 and 76, the mixture first travels through inlet 80 in muffler 78, then through central port 84 and baffle 82 and thereafter through exit port 88 in baffle 86 and through entry ports 94 in baffle 92 in water separation chamber 90. This mixture of water and exhaust gases, following the described path, separates in chamber 90, the gases passing upwardly to the top gas exit 100. The water exits through lower exit port 104 and baffle 102 and the level of water in chamber 90 is controlled by water dam 114. Air dam 108 extends down into the water in water collection chamber 112 so as to preclude air from passing out through water outlet tube 116. Instead, exhaust gases are channeled through upper port 104 to exit port 100.

An air collection chamber 120 which comprises a generally cylindrical hollow tube is connected to and extends upwardly from port 100. The downstream end of chamber 120 is connected to the upstream end of a gas acceleration chamber 122, the crosssection of which is larger at its upstream end than at its downstream end, gradually tapering through at least a portion of its length, as shown. A gas velocity tube 124 is secured to the downstream end of chamber 122 and is of a desired configuration at its downstream end to facilitate penetration by exhaust gases passing therefrom through the turbulent boundary of air surrounding hull 118 during movement of the boat in which system 70 is installed. The configuration of tube 124 at its downstream end is shown schematically in FIG. 7. Thus, tube 124 in FIG. 7 is shown to be flattened and elongated horizontally and to include a pair of spaced air dilution insertion tubes 126 projecting therefrom. Referring again to FIG. 4, one of the tubes 126 is shown passing into the upper end of tube 124 in the low pressure area thereof. Tube 126 has its upstream end extending at an angle from chamber 122 and is adapted to be disposed through or above hull 118 in a manner to facilitate passage of air therethrough. Tube 126 is positioned so that it terminates at its downstream end in the previously described low pressure area at the upper end of tube 124. This facilitates drawing of air through tube 126 into velocity tube 124 even when engine 72 is operated at low or idling speed. As previously indicated, one or a plurality of tubes 126 may be disposed in tube 124 at spaced locations.

System 70 has the advantages specified for system 10 and can be fabricated inexpensively of durable components such as corrosion resistant metals, resin impregnated fiberglass and the like. Muffler 78 and air dilution tubes 126 are optional, although preferred. It is also preferred to design baffles 86 and 106 as shown in FIG. 4 in order to provide, in the case of baffle 86 an acoustical barrier. However, the particular configuration of baffle 86 and 106 can be varied.

FIGS. 8–12

A modified version of the gas collection chamber, gas acceleration chamber, velocity tube and dilution insertion components of the improved marine wet exhaust system of the present invention is schematically illustrated in FIGS. 8–12. Thus, for example, in FIG. 8, which is a schematic vertical section, there is shown in gas collection chamber 130 which includes an initial portion 132 leading from a gas exit such as exit 38 in system 10 or 100 in system 70. Portion 132 terminates in a first stage acceleration portion 134 and is of slightly reduced diameter relative to portion 132 and is normally present only in systems for higher horsepower marine engines. Chamber 130 includes a collection portion 136 downstream of acceleration portion 134. Collection portion 136 decreases in cross sectional area towards its downstream end, as shown in FIG. 8.

Portion 136 is connected at its downstream end with gas acceleration chamber 140 which can be seen from FIG. 9 and from FIG. 8 to be curved, and includes an upper portion of decreasing cross sectional area. Chamber 140 is divided into three parallel longitudinally extending compartments comprising a pair of acceleration compartments 142 on the sides of a central high speed acceleration compartment 144. This division of chamber 140 into three compartments is accomplished through the use of a pair of parallel longitudinally extending walls 146, as shown in FIG. 9.

Compartment 144 has a pressure buildup valve 148 disposed therein, as shown in FIG. 8. Valve 148 extends across the width of compartment 144 and is curved longitudinally in a manner such that it blocks the flow of gases through compartment 144 except when the gases are at a sufficiently high pressure to force valve 148 to bend and thus open. Valve 148 can be fabricated of any suitable material such as flat spring steel or the like. With this arrangement, at low exhaust gas velocities, the exhaust gases from collection chamber 130 merely pass into and through acceleration chamber 140 utilizing only compartments 142 as passageways. However, when the marine engine to which the exhaust system is connected is operating at higher speeds and there is sufficient pressure of the exhaust gases passing into chamber 130, spring valve 148 bends to permit the gases to also pass through compartment 144. These three compartments 142 and 144 are also shown in FIG. 10.

Acceleration chamber 140 joins at its downstream end a velocity tube 150, as shown in FIG. 8. Velocity tube 150 is divided by parallel walls 152 into three parallel longitudinally extending compartments, namely, a pair of lateral compartment 154 and a central compartment 156. A separate cylindrical air dilution insertion tube 160 is disposed at the upper end of velocity tube 150 in each compartment 154. That is, the downstream end of each tube 160 terminates at the upstream end of tube 150, specifically at the upstream end of the compartments 154. Each tube 160 extends upstream for connection with a source of outside air external of the exhaust system. Each tube 160 passes through the downstream portion of chamber 140, as shown in FIG. 12. Thus, exhaust gases flow parallel to each tube 160 in the bent portion of chamber 140. However, the boundary layer of exhaust gas next adjacent the exterior of each tube 160 in chamber 140 separates along the circumference at the downstream end of each tube 160, causing a negative pressure area at that point, so that a maximum suction is established at that end to pull outside air through each tube 160 and to cause that air to exit tubes 160 to mix with and effectively dilute the main flow of exhaust gases before they exit tube 150. At low engine speeds, it is particularly important to provide the necessary air dilution of exhaust gases. It has been found that, for example, a suction equivalent to 1⅛ inches of water is obtainable at the downstream end of each tube 160 for a typical exhaust system of the present invention at an exhaust gas velocity of 45 feet per second. Thus, the suction or scarfing action provided by tubes 160 is significant.

The following examples depict the operation of system 70 utilizing the components of FIGS. 8-12, and amply demonstrate the efficient manner in which exhaust gases can be separated from coolant water, increased to high velocity, diluted and ejected so as not to recycle to the boat in which the system is installed.

A 225 horsepower [302 cubic inch] marine engine operating at 1,000 rpm is calculated to have an exhaust gas flow of 176 cubic feet per minute exiting system 70 utilizing the components of FIGS. 8-12. At 4,000 rpms the engine should have an exhaust gas flow of 705 cubic feet per minute. The 4,000 rpm speed represents a boat (cabin cruiser) speed of approximately 33 mph and a calculated exhaust gas velocity of 242 feet per second or 60 pounds per square foot. The thousand rpm engine speed produces a boat speed of 8.5 miles per hour and a calculated gas exhaust velocity of 81.5 feet per second and 8 pounds per square foot. An actual test of the engine when operating at 4,000 rpm using a 3.14 square inch collection chamber opening produced an exhaust gas velocity of 220 feet per second, very close to theoretical. This exhaust gas velocity was sufficient to cause the exhaust gases, when shaped into a narrow horizontally flattened strip via the gas velocity tube, to adequately penetrate the boundary layer of air around the rapidly moving boat (at 33 mph) and prevent the exhaust gases from entering the open rear end of the boat.

A 233 horsepower marine engine [351 cubic inch] when connected to the improved marine exhaust system of the present invention in a cabin cruiser exhibits an exhaust gas flow of 205 cubic feet per minute at 1,000 rpm and 819 cubic feet per minute at 4,000 rpm. The 819 cubic feet per minute flow represents an exhaust gas velocity of 250 feet per second or 76 pounds per square foot and the 205 cubic feet per minute flow represents an exhaust gas velocity of 84 feet per second or 8 pounds per square foot.

When a 350 horsepower marine engine [454 cubic inch] is connected to the improved exhaust system of the present invention it is calculated that at 4,000 rpm and at a boat (cabin cruiser) speed of 40 mph the exhaust gas flow should be about 1058 cubic feet per minute through a gas collection chamber outlet of 3.98 square inches, that is, 243 feet per second or 65 pounds per square foot. Actual testing indicated that at 4,000 rpm, the exhaust gas velocity was 246 feet per second, very close to the calculated velocity and adequate to totally prevent recycling of exhaust gases to the cabin cruiser in which the exhaust system and engine were installed.

Various modifications, changes, alterations and additions can be made in the present improved marine wet exhaust system and in its components and parameters and in the marine vessel employing the same. All such changes, alterations, modifications and additions as are within the scope of the appended claims form part of the present invention. What is claimed is the following:

What is claimed is:

1. An improved marine wet exhaust system comprising, in combination:
   A. An exhaust gas-cooling water separation chamber having a cooling water and exhaust gas entrance, a water exit spaced downstream from said entrance and a gas exit disposed above the level of said entrance and said water exit;
   B. a water deflector disposed in said separation chamber above the level of said entrance and said water exit but below said gas exit for deflecting water away from said gas exit while permitting gas to pass into said gas exit;
   C. a gas dam disposed in said water exit to block the passage of gas from said chamber through said water exit;
   D. A gas collection chamber connected to said gas exit and having a predetermined cross section; and,
   E. gas acceleration and flow shaping conduit means connected to the downstream end of said gas collection chamber and having a portion gradually tapering downstream to provide a predetermined back pressure in said exhaust system and a terminal portion connected thereto and shaped to cause exhaust gases when exiting therefrom to penetrate the turbulent boundary layer of air associated with the periphery of a boat in motion, said system being adapted to propel exhaust gases sufficiently far away from said boat to preclude said gases from being passed into the rear of said boat by the station wagon effect.

2. The improved marine exhaust system of claim 1 wherein said gas acceleration and shaping conduit means includes a gas acceleration chamber connected to the downstream end of said gas collection chamber and having said tapered portion, and wherein said terminal portion comprises a gas velocity tube connected to the downstream end of said gas acceleration chamber.

3. The improved marine exhaust system of claim 2 wherein said system includes means connected to said exhaust gas-cooling water separation chamber for retarding exhaust noises.

4. The improved marine exhaust system of claim 3 wherein said exhaust noise-retarding means includes a depending barrier in said water and gas entrance adapted to extend down into water passing into said water separation chamber during operation of said system.

5. The improved marine exhaust system of claim 3 wherein said exhaust noise-retarding means includes an acoustical sound suppression chamber connected to said exhaust gas-cooling water separation chamber at the upstream end thereof.

6. The improved marine exhaust system of claim 1 wherein said system includes an air dilution tube intersecting said terminal portion to provide a scarfing action on said exhaust gases passing through said terminal portion.

7. The improved marine exhaust system of claim 6 wherein one end of said air dilution tube is connected to said terminal portion upstream of the downstream end of said terminal portion.

8. The improved marine exhaust system of claim 1 wherein said system includes a water dam adjacent to said water exit to control the level of water in said separation chamber and wherein a water outlet tube is connected to said water exit.

9. The improved marine exhaust system of claim 6 wherein the downstream end of said dilution tube intersects said area of connection between said tapered portion and said terminal portion of said gas acceleration and flow shaping conduit means.

10. The improved marine exhaust system of claim 9 wherein said tapered portion is curved.

11. The improved marine exhaust system of claim 10 said tapered portion includes a plurality of longitudinally extending channels, at least one of which channels includes a valve normally blocking said channel but openable by a predetermined exhaust gas pressure.

12. The improved marine exhaust system of claim of 11 wherein said valve comprises a curved flattened spring disposed in said bent portion of such gas acceleration conduit means with the upstream end thereof fixed and the downstream end thereof openable under exhaust gas pressure.

13. The improved marine exhaust system of claim 1 wherein an initial gas acceleration conduit is disposed in a portion of said gas collection chamber and wherein a second gas acceleration conduit is connected to the downstream end of said gas collection chamber and is curved and tapered so as to narrow at its downstream end.

14. In a powered marine vessel which includes a hull, an inboard engine within the hull adapted to drive the vessel and a water cooling system for the engine, the improvement which comprises an improved marine wet exhaust system comprising, in combination:

A. An exhaust gas-cooling water separation chamber interconnected to said engine and having a cooling water and exhaust gas entrance, a water exit spaced downstream from said entrance and a gas exit disposed above the level of said entrance and said water exit;

B. a water deflector disposed in said separation chamber above the level of said entrance and said water exit but below said gas exit for deflecting water away from said gas exit while permitting gas to pass into said gas exit;

C. a gas dam disposed in said water exit to block the passage of gas from said chamber through said water exit;

D. a gas collection chamber connected to said gas exit and having a predetermined cross section; and, E. gas acceleration and flow shaping conduit means connected to the downstream end of said gas collection chamber and having a portion gradually tapering downstream to provide a predetermined back pressure in said exhaust system and a terminal portion connected thereto, terminating at a part in said hull and shaped to cause exhaust gases when exiting therefrom to penetrate the turbulent boundary layer of air around said hull when said boat is in motion, said system being adapted to propel exhaust gases sufficiently far away from said boat to preclude said gases from being passed into the rear of said boat by the station wagon effect.

15. The improvements of claim 14 wherein said gas acceleration and shaping conduit means includes a gas acceleration chamber connected to the downstream end of said gas collection chamber and having said tapered portion, and wherein said terminal portion comprises a gas velocity tube connected to the downstream end of said gas acceleration chamber.

16. The improvements of claim 15 wherein said system includes means connected to said exhaust gas-cooling water separation chamber for retarding exhaust noises.

17. The improvements of claim 16 wherein said exhaust noise-retarding means includes a depending barrier in said water and gas entrance adapted to extend down into water passing into said water separation chamber during operation of said system.

18. The improvements of claim 16 wherein said exhaust noise-retarding means includes an acoustical sound suppression chamber connected to said exhaust gas-cooling water separation chamber at the upstream end thereof.

19. The improvements of claim 14 wherein said system includes an air dilution tube intersecting said terminal portion to provide a scarfing action on said exhaust gases passing through said terminal portion.

20. The improvements of claim 19 wherein one end of said air dilution tube is connected to said terminal portion upstream of the downstream end of said terminal portion.

21. The improvements of claim 14 wherein said system includes a water dam adjacent to said water exit to control the level of water in said separation chamber and wherein a water outlet tube is connected to said water exit.

22. The improvements of claim 17 wherein said exhaust system is disposed within said hull, wherein said exhaust noise-retarding means includes a muffler connected to the upstream end of said separation chamber, wherein an air dilution tube extends through said hull and intersects said terminal portion upstream of the downstream end of said terminal portion to provide a scarfing action on exhaust gases, wherein said downstream end extends through the side of said hull, wherein a water dam is adjacent said water exit to control the water level in said separation chamber and wherein a water outlet is connected to said water exit and extends through said hull.

23. The improvements of claim 19 wherein the downstream end of said dilution tube intersects said area of connection between said tapered portion and said terminal portion of said gas acceleration and flow shaping conduit means.

24. The improvements of claim 23 wherein said tapered portion is curved.

25. The improvements of claim 24 said tapered portion includes a plurality of longitudinally extending channels, at least one of which channels includes a valve normally blocking said channel but openable by a predetermined exhaust gas pressure.

26. The improvements of claim of 25 wherein said valve comprises a curved flattened spring disposed in said bent portion of such gas acceleration conduit means with the upstream end thereof fixed and the downstream end thereof openable under exhaust gas pressure.

27. The improvements of claim 14 wherein an initial gas acceleration conduit is disposed in a portion of said gas collection chamber and wherein a second gas acceleration conduit is connected to the downstream end of said gas collection chamber and is curved and tapered so as to narrow at its downstream end.

* * * * *